United States Patent
Paglia et al.

(10) Patent No.: US 12,167,107 B2
(45) Date of Patent: Dec. 10, 2024

(54) METHOD AND SYSTEM FOR NAVIGATING TAGS ON TIME-SYNCHRONIZED CONTENT

(71) Applicant: Musixmatch S.P.A., Bologna (IT)

(72) Inventors: Marco Paglia, Bologna (IT); Paolo Spazzini, Bologna (IT); Pierpaolo Di Panfilo, Bologna (IT); Nicolae-Daniel Dima, Bologna (IT); Emanuele Cantalini, Bologna (IT); Christian Zanin, Bologna (IT)

(73) Assignee: Musixmatch S. P. A., Bologna (IT)

( * ) Notice: Subject to any disclaimer, the term of this patent is extended or adjusted under 35 U.S.C. 154(b) by 68 days.

(21) Appl. No.: 17/350,651

(22) Filed: Jun. 17, 2021

(65) Prior Publication Data

US 2022/0224994 A1  Jul. 14, 2022

Related U.S. Application Data

(60) Provisional application No. 63/136,380, filed on Jan. 12, 2021.

(51) Int. Cl.
| | |
|---|---|
| *H04N 21/472* | (2011.01) |
| *G06F 16/68* | (2019.01) |
| *G06F 16/683* | (2019.01) |
| *H04N 21/4725* | (2011.01) |
| *H04N 21/81* | (2011.01) |
| *H04N 21/845* | (2011.01) |
| *H04N 21/8547* | (2011.01) |

(52) U.S. Cl.
CPC ....... *H04N 21/8547* (2013.01); *G06F 16/685* (2019.01); *G06F 16/686* (2019.01); *H04N 21/47217* (2013.01); *H04N 21/4725* (2013.01); *H04N 21/8113* (2013.01); *H04N 21/845* (2013.01)

(58) Field of Classification Search
CPC ......... H04N 21/8547; H04N 21/47217; H04N 21/4725; H04N 21/8113; H04N 21/845; G06F 16/685; G06F 16/686
See application file for complete search history.

(56) References Cited

U.S. PATENT DOCUMENTS

| | | | |
|---|---|---|---|
| 9,305,530 B1 * | 4/2016 | Durham | G10L 25/45 |
| 10,678,415 B2 * | 6/2020 | Cho | H04N 21/41407 |
| 2009/0228799 A1 * | 9/2009 | Verbeeck | G10H 1/0008 |
| | | | 704/235 |
| 2011/0069230 A1 * | 3/2011 | Polumbus | H04N 21/4884 |
| | | | 707/711 |

(Continued)

*Primary Examiner* — Pinkal R Chokshi
(74) *Attorney, Agent, or Firm* — Dickinson Wright PLLC; Jonathan H. Harder

(57) ABSTRACT

In one embodiment, a computer-implemented method for editing navigation of a content item is disclosed. The method may include presenting, via a user interface at a client computing device, time-synchronized text pertaining to the content item; receiving an input of a tag for the time-synchronized text of the content item; storing the tag associated with the time-synchronized text of the content item; and responsive to receiving a request to play the content item: playing the content item via a media player presented in the user interface, and concurrently presenting the time-synchronized text and the tag as a graphical user element in the user interface.

6 Claims, 10 Drawing Sheets

(56) References Cited

U.S. PATENT DOCUMENTS

| | | | | |
|---|---|---|---|---|
| 2011/0276334 | A1* | 11/2011 | Wang | G10H 1/361 |
| | | | | 704/E21.001 |
| 2012/0087637 | A1* | 4/2012 | Logan | H04N 21/25891 |
| | | | | 386/241 |
| 2012/0236201 | A1* | 9/2012 | Larsen | H04N 21/439 |
| | | | | 348/468 |
| 2012/0315009 | A1* | 12/2012 | Evans | H04N 21/4828 |
| | | | | 386/230 |
| 2014/0074855 | A1* | 3/2014 | Zhao | H04N 21/8456 |
| | | | | 707/746 |
| 2014/0337761 | A1* | 11/2014 | Glass | H04L 65/403 |
| | | | | 715/753 |
| 2014/0373036 | A1* | 12/2014 | Phillips | H04N 21/42203 |
| | | | | 725/12 |
| 2015/0160915 | A1* | 6/2015 | Soroka | H04N 21/854 |
| | | | | 715/716 |
| 2015/0365716 | A1* | 12/2015 | Fonseca, Jr. | G06K 9/00751 |
| | | | | 725/41 |
| 2016/0249091 | A1* | 8/2016 | Lennon | H04N 21/43079 |
| 2019/0355337 | A1* | 11/2019 | Steinwedel | G11B 27/34 |
| 2020/0233574 | A1* | 7/2020 | Okafor | H04L 51/52 |
| 2020/0234684 | A1* | 7/2020 | Zhang | G10H 1/0008 |

* cited by examiner

METHOD AND SYSTEM FOR NAVIGATING TAGS ON TIME-SYNCHRONIZED CONTENT

CROSS-REFERENCE TO RELATED APPLICATION

This application claims priority to and the benefit of U.S. Provisional Application Patent Ser. No. 63/136,380 filed Jan. 12, 2021, the entire disclosure of which is hereby incorporated by reference.

TECHNICAL FIELD

This disclosure relates to content navigation. More specifically, this disclosure relates to methods and systems for navigating tags on time-synchronized content.

BACKGROUND

Content items (e.g., songs, movies, videos, podcasts, transcriptions, etc.) are conventionally played via a computing device, such as a smartphone, laptop, desktop, television, or the like. Navigating the content items is conventionally performed by using a seek bar, fast-forward button, and/or rewind button. Oftentimes, a user may use a see bar to attempt to find a portion of a content item they desire to play. The user may have to scroll back and forth using the seek bar until the desired portion of the content item is found. Accordingly, conventional navigation is inaccurate, time-consuming, inefficient, and resource-wasteful.

SUMMARY

In one embodiment, a computer-implemented method for editing navigation of a content item is disclosed. The method may include presenting, via a user interface at a client computing device, time-synchronized text pertaining to the content item; receiving an input of a tag for the time-synchronized text of the content item; storing the tag associated with the time-synchronized text of the content item; and responsive to receiving a request to play the content item: playing the content item via a media player presented in the user interface, and concurrently presenting the time-synchronized text and the tag as a graphical user element in the user interface.

In one embodiment, a computer-implemented method for a client device presenting a media player is disclosed. The computer-implemented method includes receiving a content item comprising a plurality of tags associated with a plurality of time-synchronized text items; presenting, in a first portion of a user interface, the plurality of time-synchronized text items; presenting, in a second portion of the user interface, the plurality of tags associated with the plurality of time-synchronized text items, wherein each of the plurality of tags presents a tag identity and a timestamp associated with a respective time-synchronized text item; receiving, via the user interface, a selection of a first tag of the plurality of tags associated with the plurality of time-synchronized text items; and causing a media player to begin playback of the content item at the timestamp for a time-synchronized text item corresponding to the selected first tag.

In one embodiment, a computer-implemented method for a server device to associate tags with time-synchronized text items of a content item is disclosed. The computer-implemented method includes generating time-synchronized text corresponding to audio of a content item; causing, via a user interface at a client computing device, presentation of the time-synchronized text pertaining to the content item; receiving an input of a tag for the time-synchronized text of the content item; storing the tag associated with the time-synchronized text of the content item; and responsive to receiving a request to play the content item: causing playback of the content item via a media player presented in the user interface, and concurrently causing presentation of the time-synchronized text and the tag as a graphical user element in the user interface.

In one embodiment, a tangible, non-transitory computer-readable medium stores instructions that, when executed, cause a processing device to perform any operation of any method disclosed herein.

In one embodiment, a system includes a memory device storing instructions and a processing device communicatively coupled to the memory device. The processing device executes the instructions to perform any operation of any method disclosed herein.

Other technical features may be readily apparent to one skilled in the art from the following figures, descriptions, and claims.

BRIEF DESCRIPTION OF THE DRAWINGS

For a detailed description of example embodiments, reference will now be made to the accompanying drawings in which.

NOTATION AND NOMENCLATURE

Figure 1:
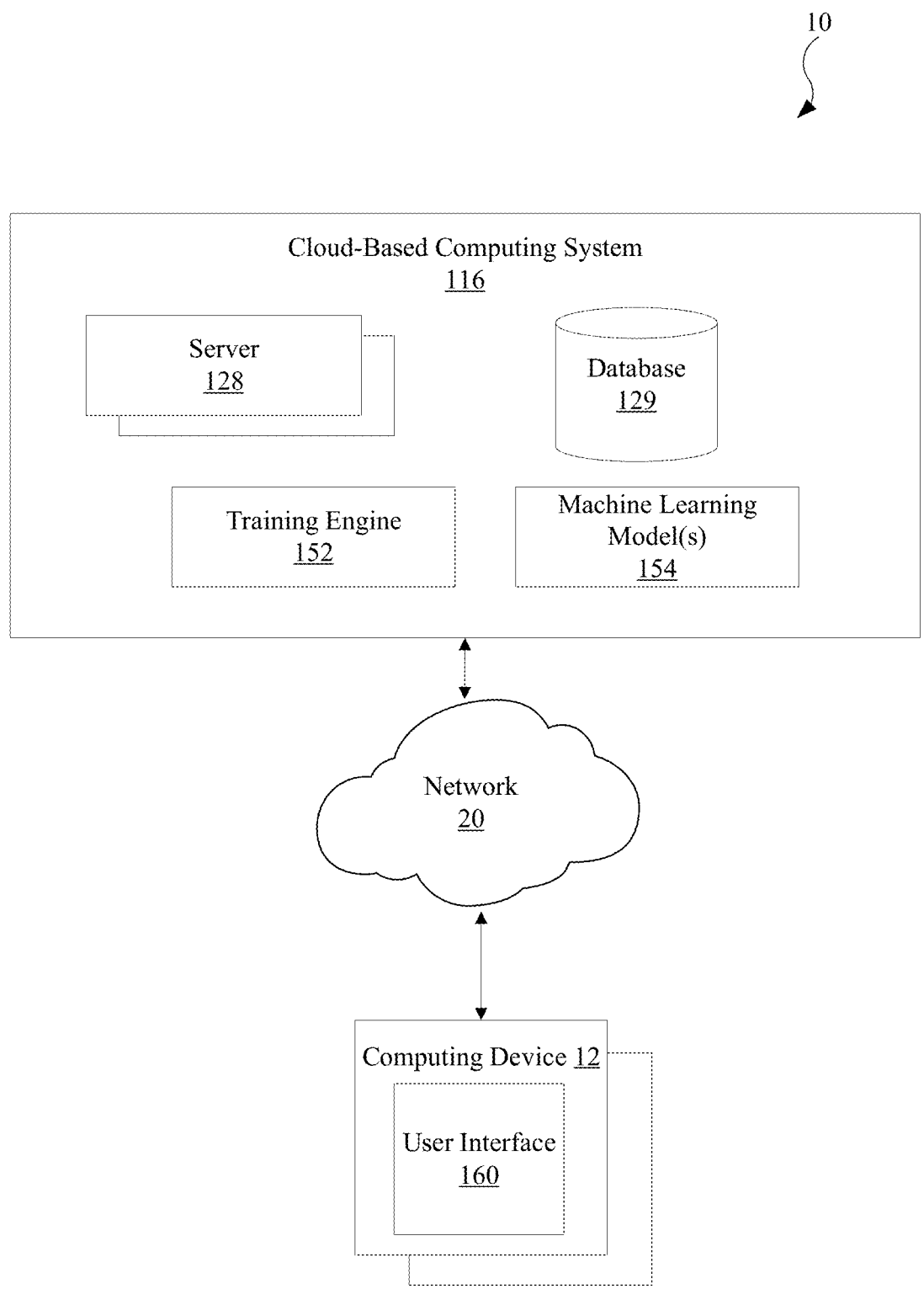
FIG. 1 illustrates a system architecture according to certain embodiments of this disclosure.

Various terms are used to refer to particular system components. Different entities may refer to a component by different names—this document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

The terminology used herein is for the purpose of describing particular example embodiments only, and is not intended to be limiting. As used herein, the singular forms "a," "an," and "the" may be intended to include the plural forms as well, unless the context clearly indicates otherwise. The method steps, processes, and operations described herein are not to be construed as necessarily requiring their performance in the particular order discussed or illustrated, unless specifically identified as an order of performance. It is also to be understood that additional or alternative steps may be employed.

The terms first, second, third, etc. may be used herein to describe various elements, components, regions, layers and/or sections; however, these elements, components, regions, layers and/or sections should not be limited by these terms. These terms may be only used to distinguish one element, component, region, layer or section from another region, layer or section. Terms such as "first," "second," and other numerical terms, when used herein, do not imply a sequence or order unless clearly indicated by the context. Thus, a first element, component, region, layer or section discussed below could be termed a second element, component, region, layer or section without departing from the teachings of the example embodiments. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. In another example, the phrase "one or more" when used with a list of items means there may be one item or any suitable number of items exceeding one.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), solid state drives (SSDs), flash memory, or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

DETAILED DESCRIPTION

The following discussion is directed to various embodiments of the disclosed subject matter. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

FIGS. 1 through 10, discussed below, and the various embodiments used to describe the principles of this disclosure in this patent document are by way of illustration only and should not be construed in any way to limit the scope of the disclosure.

Interaction with digital media (e.g., content items) has remained stagnant for a long time. The term "content item" as used herein may refer to a song, movie, video, clip, podcast, audio, transcription, or any suitable multimedia. To play a content item, a user conventionally presses or clicks a play button. When the user desires to play a specific portion of the content item, the user may use a seek bar (e.g., via touchscreen or using a mouse) to scroll to a certain portion of the content item. In some instances, the user may click or select a fast-forward or rewind button to navigate to the desired portion of the content item. However, such navigation methods are inaccurate. For example, when the seek bar is used to navigate, the timing numbers update in rapid succession until eventually the user manages to find the portion of the content item they desire. There is a need in the industry for a technical solution to the technical problem of navigating content items in a more sophisticated and technically efficient manner.

Accordingly, the disclosed techniques provide methods, systems, and computer-readable media for navigating tags on time-synchronized content items. It should be noted that songs will be described as the primary content items herein, but the techniques apply to any suitable content item. Songs have structures including stanzas, and the stanzas may include various portions: verses, pre-choruses, choruses, hooks, bridges, outros, and the like. Further, the songs may include text, such as lyrics, that is time-synchronized with audio of the song by a cloud-based computing system. For example, each lyric may be timestamped and associated with its corresponding audio such that the lyric is presented lockstep on a user interface of a user's computing device when a media play plays the audio of the song. In some embodiments, the stanzas may be tagged with a tag that identifies the stanza as being a verse, chorus, outro, etc.

Moreover, in some embodiments, the disclosed techniques provide a user interface that enable a user to edit time-synchronized lyrics of a song to add tags to the various lyrics. For example, the user may select a portion of the lyrics and add a tag (# chorus) that indicates that portion of the lyrics at that synchronized time is the chorus. The user may save the tags that are added to the lyrics. When the song is played again, the added tags may appear as graphical user elements on the user interface of a media player playing the song. The graphical user elements representing the tags may include timestamps of when the portion of the song begins and the identifier of the tag (e.g., chorus). If a user selects the graphical user element representing the tag of the chorus, the media player may immediately begin playing the song at the timestamp of the portion of the song including the chorus. Further, as the user uses the seek bar to scan a song, each of the graphical user elements representing the structure of the song may be actuated (e.g., highlighted) at respective times when the tags apply to the portions of the song being played.

Such techniques may enhance navigating a song as the song is played and/or to "jump" to a portion of a desired song much more easily than previously allowed. That is, there may be numerous graphical user elements representing tags presented sequentially by timestamp in the user interface including the media player playing a song. For example, one graphical user element representing a tag may include a timestamp (0:15 minutes) and an identity of the tag (e.g., intro), the next graphical user element representing the next graphical user element may include another timestamp (0:30) and an identity of another tag (e.g., verse), yet another graphical user element representing yet another graphical user element may include another timestamp (0:45) and an identity of another tag (e.g., chorus). Upon any of the graphical user elements being selected, the song may begin playing in the media player at the timestamp associated with the tag represented by the selected graphical user element.

In some embodiments, the disclosed techniques enable a user to use voice commands with a smart device to ask the smart device to "play the chorus of SONG A". Upon receiving such a voice command, the smart device may begin playing SONG A at the portion of the song representing the chorus, which was previously tagged by a user and/or a trained machine learning model. The smart device and/or a cloud-based computing system may receive the voice command and process the audio using natural language processing to parse the audio data and determine what words were spoken. The determined words and/or audio data may be compared to data identifying the song and/or the tag requested. If the smart device and/or cloud-based computing system identifies the song and/or the tag requested, the smart device may begin playing the song at the timestamp associated with the tag. Such a technique is a technical solution to enabling a user to navigate songs more efficiently using smart devices at the portion of the songs the users desire without having to use a scanning mechanism (e.g., scroll bar, fast-forward button, rewind button, etc.).

In some embodiments, machine learning models may be trained to analyze songs, determine what stanzas are included in the songs, and to tag the various stanzas. The machine learning models may be trained with training data including songs with their lyrics and the lyrics may be labeled with tags. The machine learning models may compare the audio and/or process the lyrics to correlate the audio and/or the lyrics with the tags. Once trained, the machine learning models may receive a new song as input and process its audio and/or lyrics to identify a match with another songs audio and/or lyrics. Based on the match, the machine learning models may be trained to output the corresponding tags for the audio and/or lyrics. The tagged stanzas may be presented to a user via a user interface for the user to review the tagged stanzas. The user may approve, decline, and/or edit the stanzas tagged by the machine learning models. In some embodiments, the machine learning models may be trained to analyze tags that are entered by a user and determine whether the tags are accurate or not. For example, the user may tag a stanza of a song as "chorus" but the machine learning model may be trained to determine the stanza is a "verse" (either based on previous tags, similar lyrics of the same song, similar lyrics of a different song, etc.). In such an instance, the machine learning models may cause a notification to be presented on a user interface that indicates the tag the user entered may be inaccurate.

Further, the disclosed techniques enable a user to discover new music more efficiently by allowing the users to skip to the most important parts of a song to determine whether they like the "vibe" of the song. Additionally, such techniques may enable learning a song more quickly because the techniques enable playing a song part by part (e.g., intro, verse, chorus, outro, etc.). As such, the disclosed techniques may save computing resources (e.g., processor, memory, network bandwidth) by enabling a user to use a computing device to just consume desired portions of a song instead of the entire file representing the entire song. That is, the disclosed techniques may provide a very granular mechanism that enables navigating songs more efficiently.

Turning now to the figures, FIG. 1 depicts a system architecture 10 according to some embodiments. The system architecture 10 may include one or more computing devices 12 of one or more users communicatively coupled to a cloud-based computing system 116. Each of the computing devices 12 and components included in the cloud-based computing system 116 may include one or more processing devices, memory devices, and/or network interface cards. The network interface cards may enable communication via a wireless protocol for transmitting data over short distances, such as Bluetooth, ZigBee, NFC, etc. Additionally, the network interface cards may enable communicating data over long distances, and in one example, the computing devices 12 and the cloud-based computing system 116 may communicate with a network 20. Network 20 may be a public network (e.g., connected to the Internet via wired (Ethernet) or wireless (WiFi)), a private network (e.g., a local area network (LAN) or wide area network (WAN)), or a combination thereof. Network 20 may also comprise a node or nodes on the Internet of Things (IoT).

The computing devices 12 may be any suitable computing device, such as a laptop, tablet, smartphone, or computer. The computing devices 12 may include a display capable of presenting a user interface 160 of an application. The application may be implemented in computer instructions stored on the one or more memory devices of the computing devices 12 and executable by the one or more processing devices of the computing device 12. The application may present various screens to a user. For example, the user interface 160 may present a media player that enables playing a content item, such as a song. When the user actuates a portion of the user interface 160 to play the content item, the display may present video associated with the content item and/or a speaker may emit audio associated with the content item. Further, the user interface 160 may be configured to present time-synchronized text associated with the content item in a first portion and one or more tags associated with a structure of the content item in a second portion. The tags may correspond to stanzas of a song and may refer to an intro, a verse, a chorus, a bridge, an outro, etc. The user interface 160 may enable a user to edit the time-synchronized text of the content item by assigning tags, modifying tags, deleting tags, etc. Once the tags are saved, during playback of the content item, the user may select one of the tags displayed in the user interface 160 to immediately jump to, skip to, or move the playback of the content item to a timestamp associated with the tag.

Such techniques provide for enhanced navigation of content items. Further, the user may use voice commands to trigger the tags to navigate the content items. In some embodiments, trained machine learning models may analyze content items and assign tags. In some embodiments, the trained machine learning models may determine that consecutive portions of the time-synchronized text are labeled with the same tag and may bundle those portions into a group and provide a single tag for the portions. that enable the three-parties (e.g., candidate, referrer, and hiring entity) to perform the functionalities described herein. In some embodiments, the application is a stand-alone application installed and executing on the computing devices 12, 13, 15. In some embodiments, the application (e.g., website) executes within another application (e.g., web browser). The computing devices 12 may also include instructions stored on the one or more memory devices that, when executed by the one or more processing devices of the computing devices 12 perform operations of any of the methods described herein.

In some embodiments, the cloud-based computing system 116 may include one or more servers 128 that form a distributed computing architecture. The servers 128 may be a rackmount server, a router computer, a personal computer, a portable digital assistant, a mobile phone, a laptop computer, a tablet computer, a camera, a video camera, a netbook, a desktop computer, a media center, any other device capable of functioning as a server, or any combination of the above. Each of the servers 128 may include one or more processing devices, memory devices, data storage, and/or network interface cards. The servers 128 may be in communication with one another via any suitable communication protocol. The servers 128 may execute an artificial intelligence (AI) engine that uses one or more machine learning models 154 to perform at least one of the embodiments disclosed herein. The cloud-based computing system 128 may also include a database 129 that stores data, knowledge, and data structures used to perform various embodiments. For example, the database 129 may store the content items, the time-synchronized text, the tags and their association with the time-synchronized text, user profiles, etc. In some embodiments, the database 129 may be hosted on one or more of the servers 128.

In some embodiments the cloud-based computing system 116 may include a training engine 152 capable of generating the one or more machine learning models 154. The machine learning models 154 may be trained to analyze content items and to assign tags to various time-synchronized text included in the content items, to determine whether a user has entered an incorrect tag for a time-synchronized text, and the like. The one or more machine learning models 154 may be generated by the training engine 130 and may be implemented in computer instructions executable by one or more processing devices of the training engine 152 and/or the servers 128. To generate the one or more machine learning models 154, the training engine 152 may train the one or more machine learning models 154.

The training engine 152 may be a rackmount server, a router computer, a personal computer, a portable digital assistant, a smartphone, a laptop computer, a tablet computer, a netbook, a desktop computer, an Internet of Things (IoT) device, any other desired computing device, or any combination of the above. The training engine 152 may be cloud-based, be a real-time software platform, include privacy software or protocols, and/or include security software or protocols.

To generate the one or more machine learning models 154, the training engine 152 may train the one or more machine learning models 154. The training engine 152 may use a base data set of content items including their time-synchronized text and labels corresponding to tags of the time-synchronized text.

The one or more machine learning models 154 may refer to model artifacts created by the training engine 152 using training data that includes training inputs and corresponding target outputs. The training engine 152 may find patterns in the training data wherein such patterns map the training input to the target output and generate the machine learning models 154 that capture these patterns. For example, the machine learning model may receive a content item, determine a similar content item based on the audio, time-synchronized text, video, etc. and determine various tags for the content item based on the similar content item. Although depicted separately from the server 128, in some embodiments, the training engine 152 may reside on server 128. Further, in some embodiments, the database 150, and/or the training engine 152 may reside on the computing devices 12, 13, and/or 15.

As described in more detail below, the one or more machine learning models 154 may comprise, e.g., a single level of linear or non-linear operations (e.g., a support vector machine [SVM]) or the machine learning models 154 may be a deep network, i.e., a machine learning model comprising multiple levels of non-linear operations. Examples of deep networks are neural networks, including generative adversarial networks, convolutional neural networks, recurrent neural networks with one or more hidden layers, and fully connected neural networks (e.g., each neuron may transmit its output signal to the input of the remaining neurons, as well as to itself). For example, the machine learning model may include numerous layers and/or hidden layers that perform calculations (e.g., dot products) using various neurons.

Figure 2:
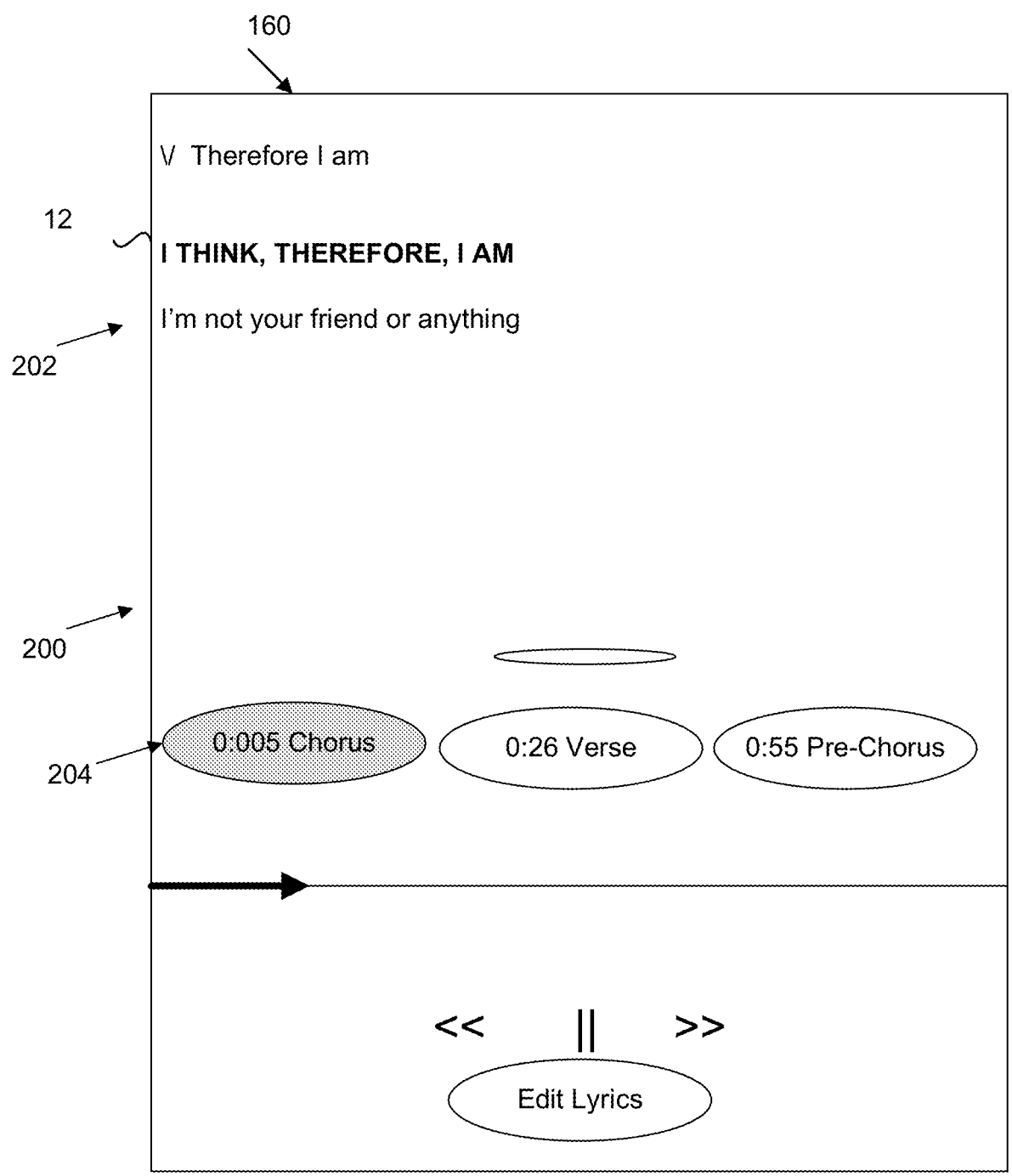
FIG. 2 illustrates a user interface including a media player playing a song and presenting lyrics and a selected tag according to certain embodiments of this disclosure.

FIG. 2 illustrates a user interface 160 including a media player 200 playing a song and presenting lyrics 202 and a selected tag 204 according to certain embodiments of this disclosure. The user interface 160 is presented on the computing device 12 of a user. As depicted, the media player 200 is playing a song titled "Therefore I am". The lyrics 202 for the song are presented on the user interface 160. The lyrics may be emphasized lockstep with the audio (e.g., time-synchronized) such that the lyrics are modified when their respective portion of the song is played via audio. As depicted, "I THINK, THEREFORE, I AM" is emphasized in such a manner for the time-synchronized text with the audio of the song. Further, as depicted, the tag 204 is selected, and it includes a tag identity (e.g., "Chorus") and a timestamp of when the tag for the particular tag identity begins. Also, there are additional tags that are depicted in the diagram. For example, a second tag "0:26 Verse" indicates that if the user desires to hear the verse at the 0:26 mark, the user should select the graphical user element representing that tag. A third tag indicates "0:55 Pre-Chorus", and selection of that graphical user element on the user interface 160 causes playback of the content item to skip to that timestamp. As depicted, the media player 200 includes graphical user elements to fast-forward, rewind, pause, and/or play content items. Further, the media player 200 includes a seek bar that enables a user to use a touchscreen and/or a mouse to scroll through various portions of the content item. As the user scrolls through the content item, the corresponding graphical user elements associated with the tags may be actuated (e.g., highlighted, emphasized, etc.). The lyrics 202 may be presented in a first portion of the user interface 160 and the tags (e.g., 204) may be concurrently presented in a second portion of the user interface 160. Such an enhanced user interface may provide a better user experience and enhance a user's enjoyment of using the computing device while consuming the content item.

Figure 3:
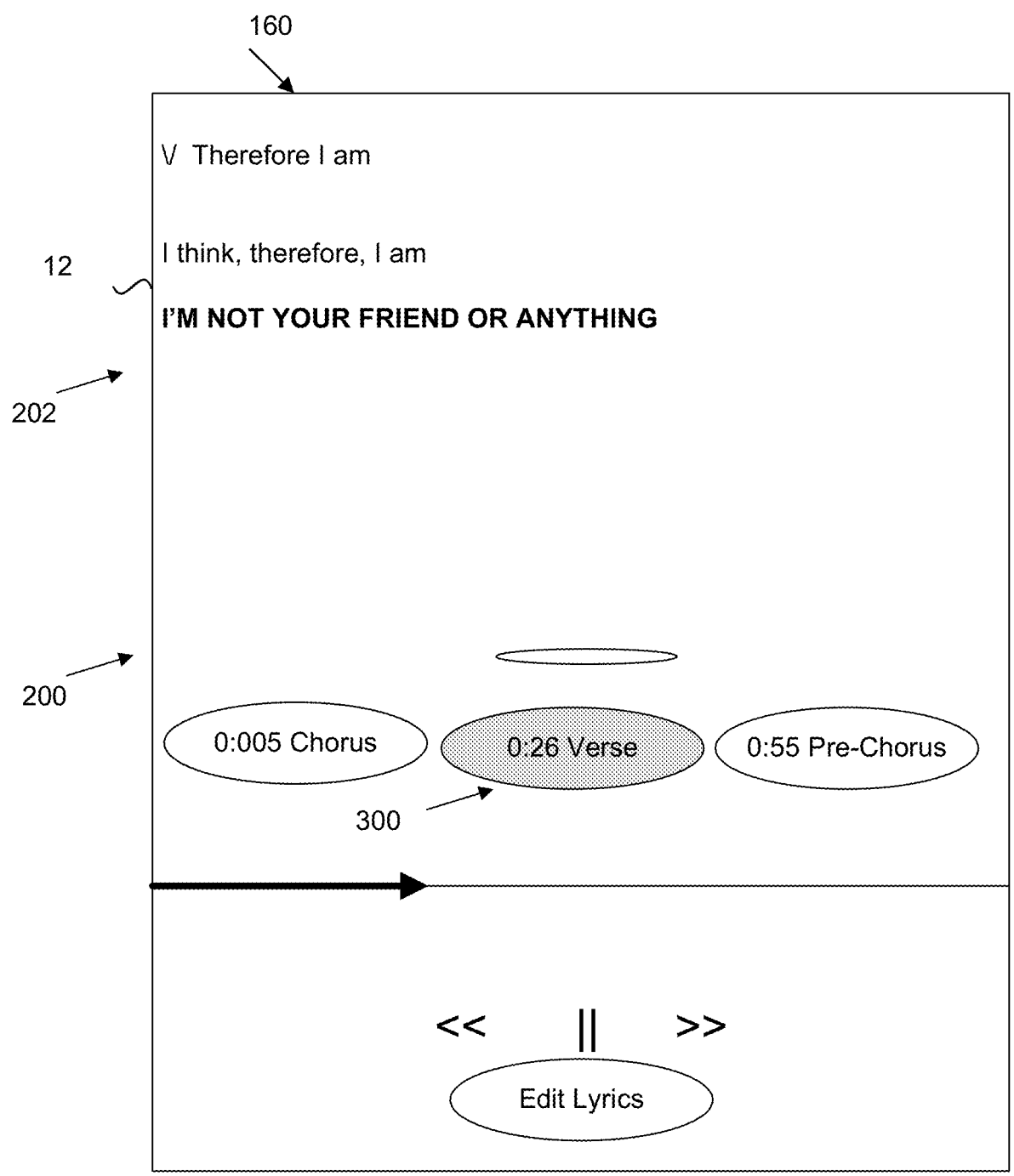
FIG. 3 illustrates a user interface including a media player playing a song and presenting lyrics and another selected tag according to certain embodiments of this disclosure.

FIG. 3 illustrates a user interface 160 including a media player 200 playing a song and presenting lyrics 202 and another selected tag 300 according to certain embodiments of this disclosure. As depicted, the selected tag 300 represents the timestamp of 0:26 and has a tag identity of "Verse". After the user selected the tag 300, the media player began playback of the content item at 0:26 and emphasized the time-synchronized text of "I'M NOT YOUR FRIEND OR ANYTHING". As such, the user interface 160 and the media player 200 dynamically adjust based on which tag is selected.

Figure 4:
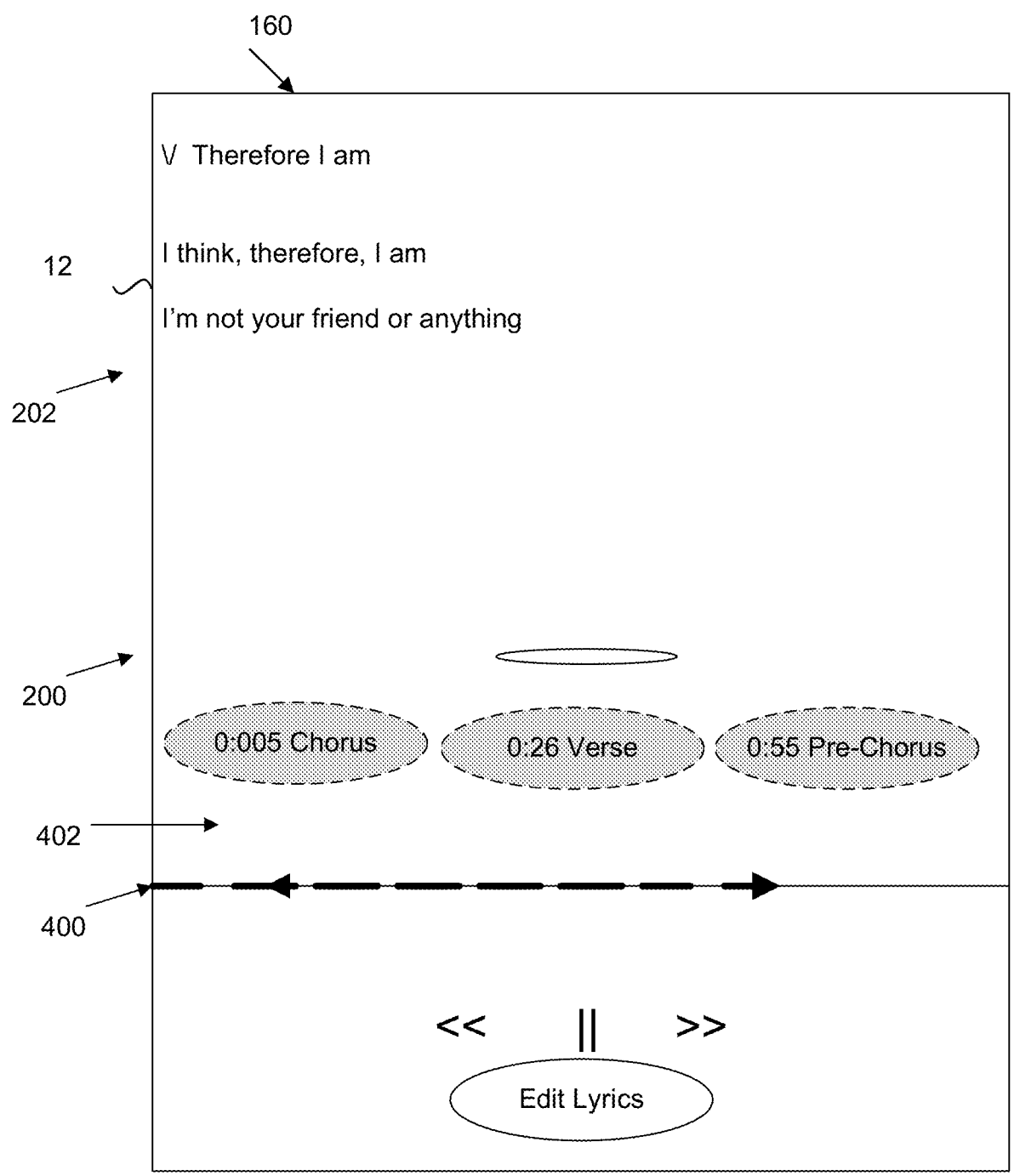
FIG. 4 illustrates a user interface including a media player playing a song and presenting lyrics and tags during scrolling according to certain embodiments of this disclosure.

FIG. 4 illustrates a user interface 160 including a media player 200 playing a song and presenting lyrics 202 and tags during scrolling according to certain embodiments of this disclosure. As depicted, a seek bar 400 may be presented on the user interface 160. A user may use a touchscreen, mouse, keyboard, or any suitable input peripheral to use the seek bar. As the user actuates the seek bar to scroll forward or backward in the content item, the various tags 402 are actuated (e.g., emphasized, highlighted, etc.) when their corresponding time-synchronized text is presented on the user interface 160.

Figure 5:
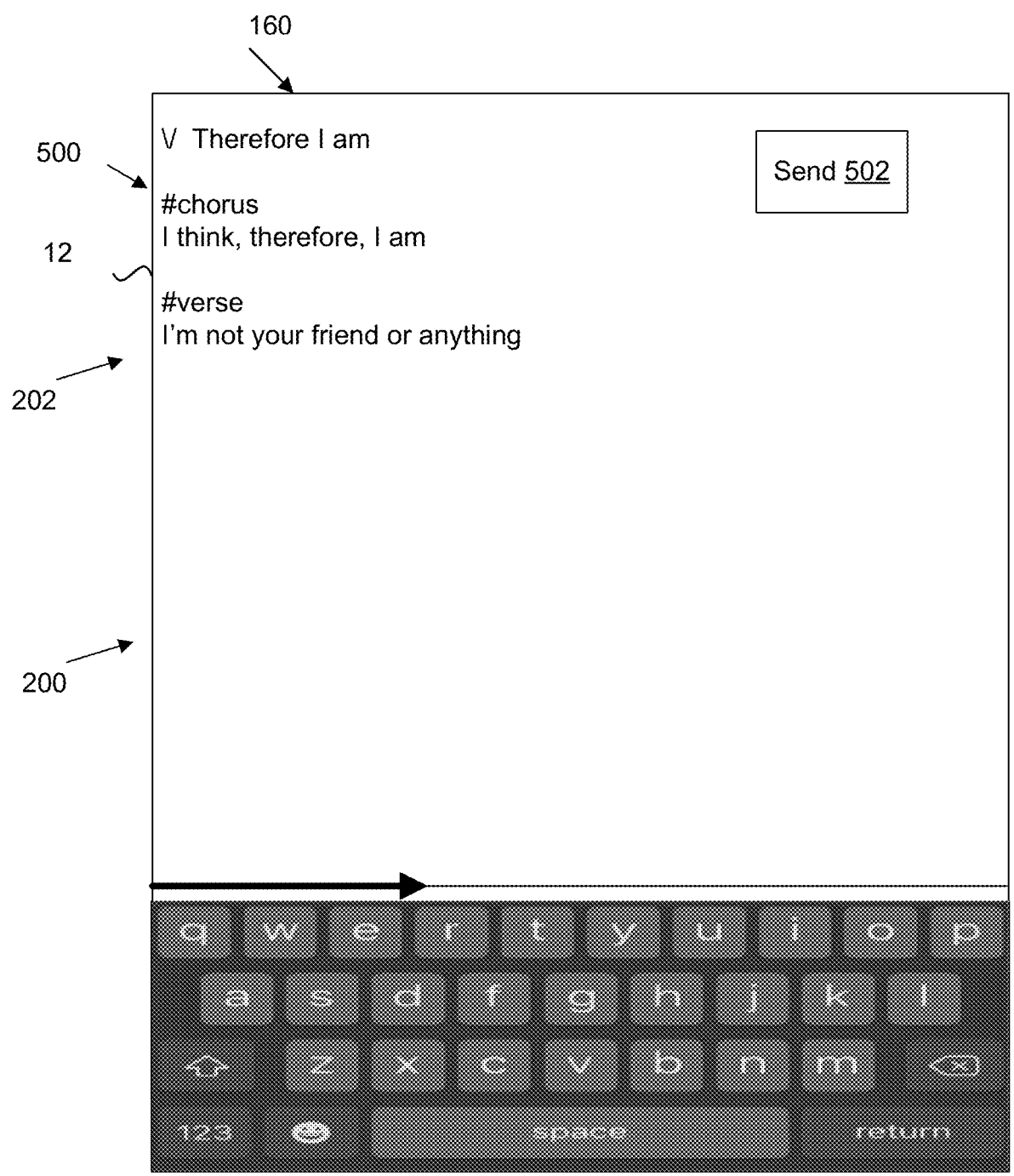
FIG. 5 illustrates a user interface including a media player during an edit mode where a user edits tags for lyrics according to certain embodiments of this disclosure.

FIG. 5 illustrates a user interface 160 including a media player 200 during an edit mode where a user edits tags 500 for lyrics 202 according to certain embodiments of this disclosure. To enter this mode, the user may select a graphical user element titled "Edit Lyrics" or has any suitable title. The user interface 160 may be presented via an application installed on the user's computing device 12 and/or a web browser executing on the user's computing device 12. The user interface 160 may enable direct entry of tags to associated time-synchronized text. For example, as depicted, the time-synchronized text "I think, therefore, I am" is tagged with "# chorus", and the time-synchronized text "I'm not your friend or anything" is tagged with "# verse". The user may select graphical user element 502 (e.g. button) to save the tags with the time-synchronized text to the file representing the content item at the cloud-based computing system 116. Once these tags are saved to the file representing the content item in the cloud-based computing system 116, the tags may appear as graphical elements on the user interface 160 during playback of the content item and may enable navigating to the portion of the content item associated with the tags. For example, the time-synchronized text and the tags may be concurrently presented on the user interface 160 during playback of the content item using the media player.

Figure 6:
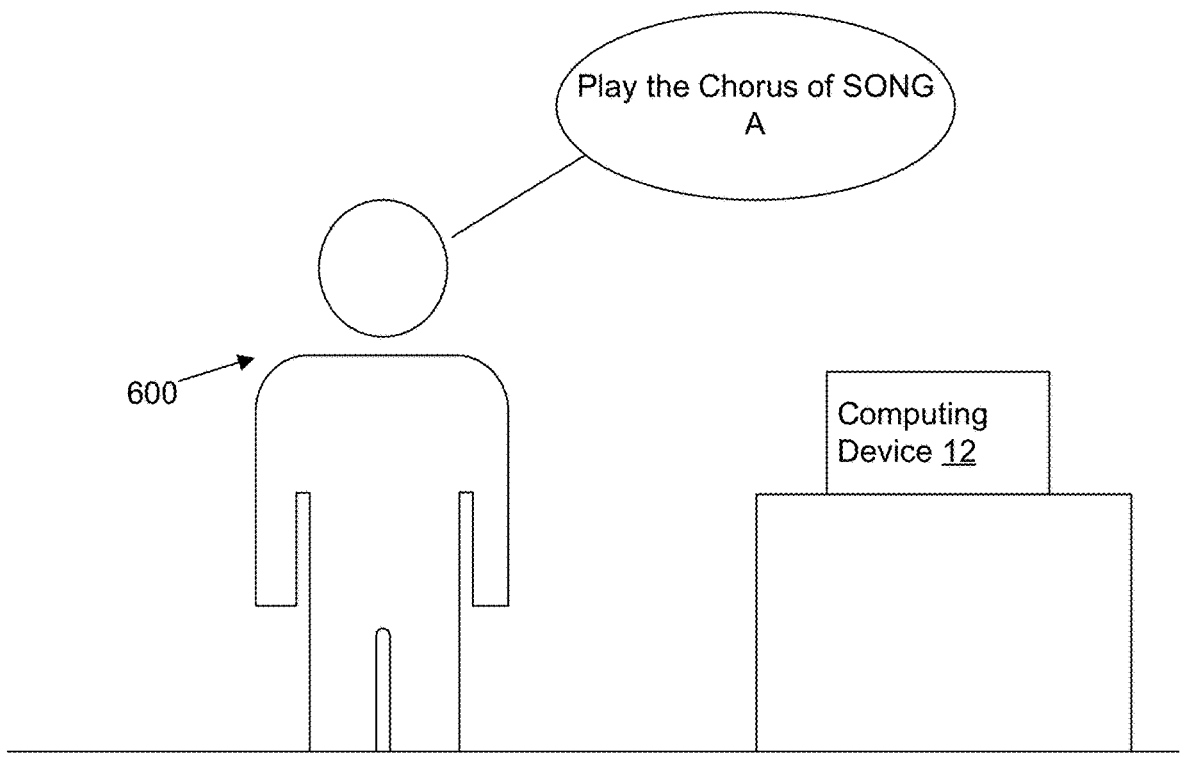
FIG. 6 illustrates a user instructing a smart device to play a content item at a particular tag according to certain embodiments of this disclosure.

FIG. 6 illustrates a user 600 instructing a smart device (e.g., computing device 12) to play a content item at a particular tag according to certain embodiments of this disclosure. As depicted, the user 600 may say a voice command to the smart device. The smart device may receive the voice command and process the voice command to being playing the content item at the tag identified by the user 600. Using enhanced voice commands may provide an enriched user experience of computing devices. Further, the tags may be granularly tailored in such a way that the user may say "play the song with the guitar solo by Slash", etc. That is, the tags may not only enable tagging structures of content item but tagging any time-synchronized data based on any suitable attribute.

Figure 7:
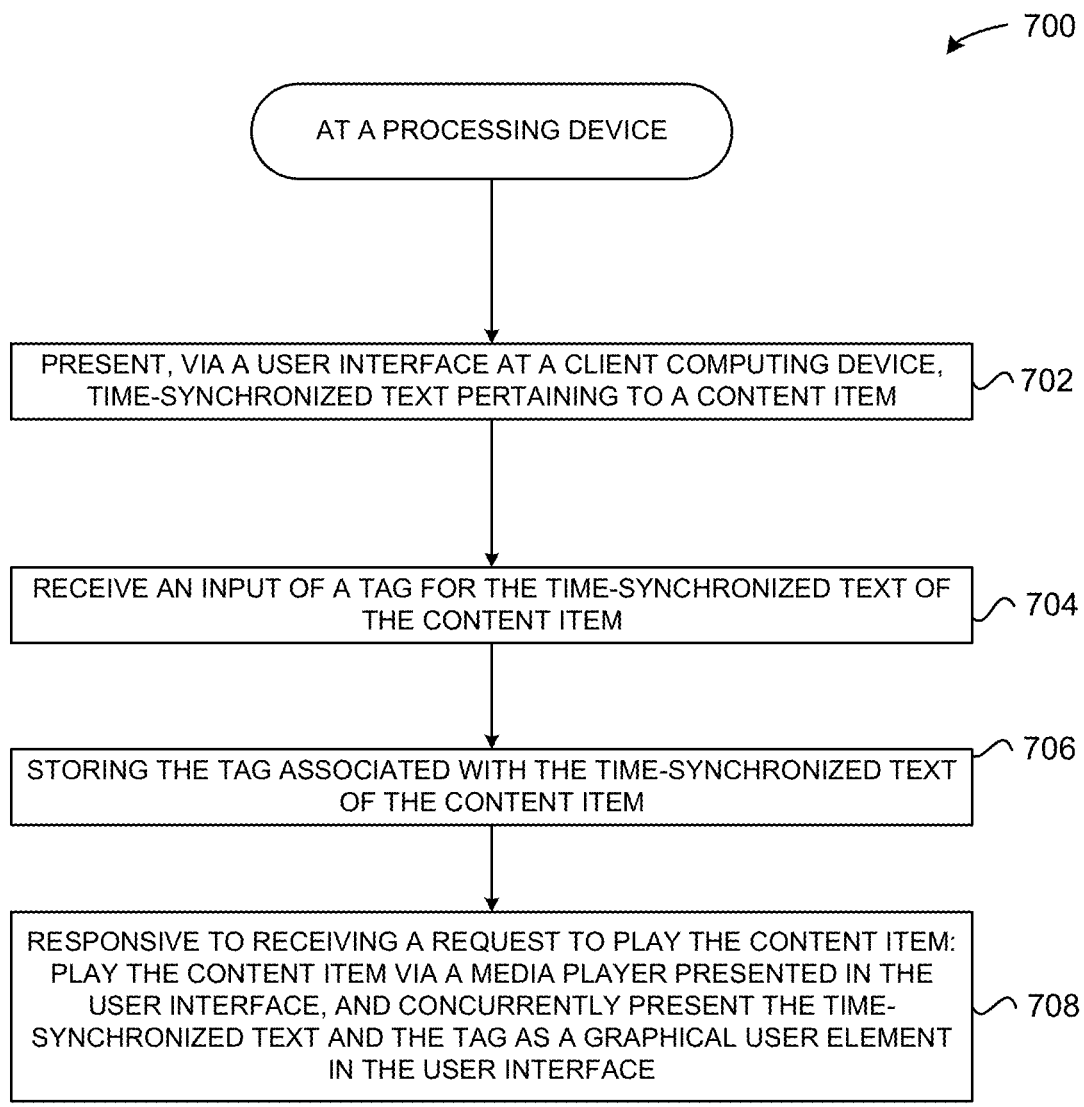
FIG. 7 illustrates an example of a method for generating tags for time-synchronized text pertaining to content items according to certain embodiments of this disclosure.

FIG. 7 illustrates an example of a method 700 for generating tags for time-synchronized text pertaining to content items according to certain embodiments of this disclosure. The method 700 may be performed by processing logic that may include hardware (circuitry, dedicated logic, etc.), software, or a combination of both. The method 700 and/or each of their individual functions, subroutines, or operations may be performed by one or more processors of a computing device (e.g., any component (server 128, training engine 152, machine learning models 154, etc.) of cloud-based computing system 116 and/or computing device 12 of FIG. 1) implementing the method 700. The method 700 may be implemented as computer instructions stored on a memory device and executable by the one or more processors. In certain implementations, the method 700 may be performed by a single processing thread. Alternatively, the method 700 may be performed by two or more processing threads, each thread implementing one or more individual functions, routines, subroutines, or operations of the methods.

At block 702, the processing device may present, via the user interface 160 at the client computing device 12, time-synchronized text pertaining to the content item (e.g., song). The cloud-based computing system 116 may have synchronized the text with the audio of the content item prior to the computing device 12 receiving the content item.

At 704, the processing device may receive an input of a tag for the time-synchronized text of the content item. The tag may be entered via the user interface 160 by a user entering text having a particular syntax (e.g., # chorus). In some embodiments, the tags may be generated and entered via a trained machine learning model that parses the time-synchronized text and determines the tag based on training data (e.g., previous text and labeled structures of text). In some embodiments, the content item may be a song and the time-synchronized text may be lyrics.

At 706, the processing device may store the tag associated with the time-synchronized text of the content item. For example, the tag associated with the time-synchronized text may be stored at the database 129.

At 708, responsive to receiving a request to play the content item, the processing device may play the content item via a media player presented in the user interface, and concurrently present the time-synchronized text and the tag as a graphical user element in the user interface 160.

In some embodiments, responsive to receiving a selection of a graphical user element representing the tag, the processing device may modify playback of the content item to a timestamp associated with the tag. The playback may be provided via a media player executing at the client computing device 12 in the user interface 160. In some embodiments, the graphical user element representing the tag may be presented in a second portion of the user interface 160 while the first portion of the user interface 160 presents the time-synchronized text and a speaker of the computing device 12 emits audio of the content item.

In some embodiments, the processing device may receive a request to enter an edit mode. Responsive to receiving the request to enter the edit mode, the processing device may pause playback of the content item. The processing device may simultaneously or concurrently present the time-synchronized text in a first portion of the user interface and receive and receiving the input of the tag in the first portion of the user interface. That is, the time-synchronized text and the tag may be depicted together in the user interface 160 of the computing device 12 in the edit mode. The user may select to save the changes to the time-synchronized text. In some embodiments, the graphical user element may be a text-structure shortcut.

In some embodiments, the user interface 160 may present a set of tags representing text-structure shortcuts. Responsive to receiving a selection of a tag, the media player may be configured to modify playback of the content item to a timestamp associated with the tag.

In some embodiments, the processing device may receive a voice command to play the tag of the content item (e.g., "play the CHORUS of SONG A"). Based on the voice command, the processing device may use the media player to modify playback such that the content item is played at a timestamp associated with the tag of the content item.

Figure 8:
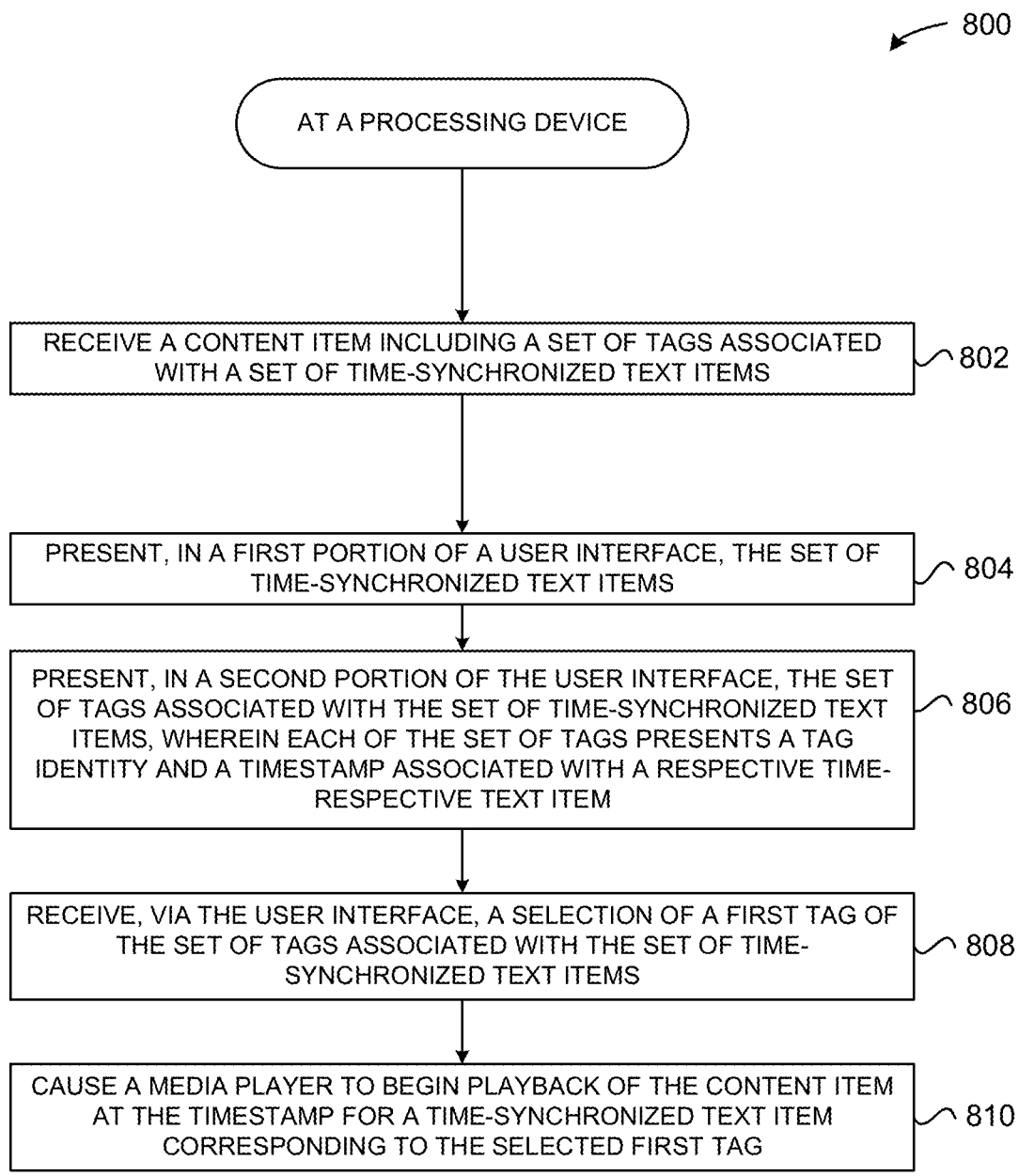
FIG. 8 illustrates an example of a method for presenting tags for time-synchronized text according to certain embodiments of this disclosure.

FIG. 8 illustrates an example of a method 800 for presenting tags for time-synchronized text according to certain embodiments of this disclosure. The method 800 may be performed by processing logic that may include hardware (circuitry, dedicated logic, etc.), software, or a combination of both. The method 800 and/or each of their individual functions, subroutines, or operations may be performed by one or more processors of a computing device (e.g., any component (server 128, training engine 152, machine learning models 154, etc.) of cloud-based computing system 116 and/or computing device 12 of FIG. 1) implementing the method 800. The method 800 may be implemented as computer instructions stored on a memory device and executable by the one or more processors. In certain implementations, the method 800 may be performed by a single processing thread. Alternatively, the method 800 may be performed by two or more processing threads, each thread implementing one or more individual functions, routines, subroutines, or operations of the methods.

At block 802, the processing device may receive a content item including a set of tags associated with a set of time-synchronized text items.

At block 804, the processing device may present, in a first portion of the user interface 160, the set of time-synchronized text items.

At block 806, the processing device may present, in a second portion of the user interface 160, the set of tags associated with the set of time-synchronized text items. Each of the set of tags may present a tag identity and a timestamp associated with a respective time-synchronize text item.

At block 808, the processing device may receive, via the user interface 160, a selection of a first tag of the set of tags associated with the set of time-synchronized text items. In some embodiments, selection of a tag may cause the associated time-synchronized text to be identified via highlighting, font-modification, color-coding, or some combination thereof. That is, the selection of a tag may cause the associated time-synchronized text to be emphasized in some technical manner.

At block 810, the processing device may cause a media player to begin playback of the content item at the timestamp for a time-synchronized text item corresponding to the selected first tag.

In some embodiments, the processing device may receive a selection to edit the time-synchronized text item. A user may desire to add, edit, and/or remove one or more tags from the structure of the content item. In some embodiments, the content item may be a song and a the time-synchronized text may be lyrics. In some embodiments, the processing device may receive a modification to one of the set of tags and may cause presentation of the modification to the one of the set of tags on the user interface 160 including the media player. In some embodiments, the processing device may receive, via the user interface 160, a selection of a tag of the set of tags associated with the set of time-synchronized text items, and the processing device may cause the media player to begin playback of the content item at a timestamp for a time-synchronized text item corresponding to the selected tag.

Figure 9:
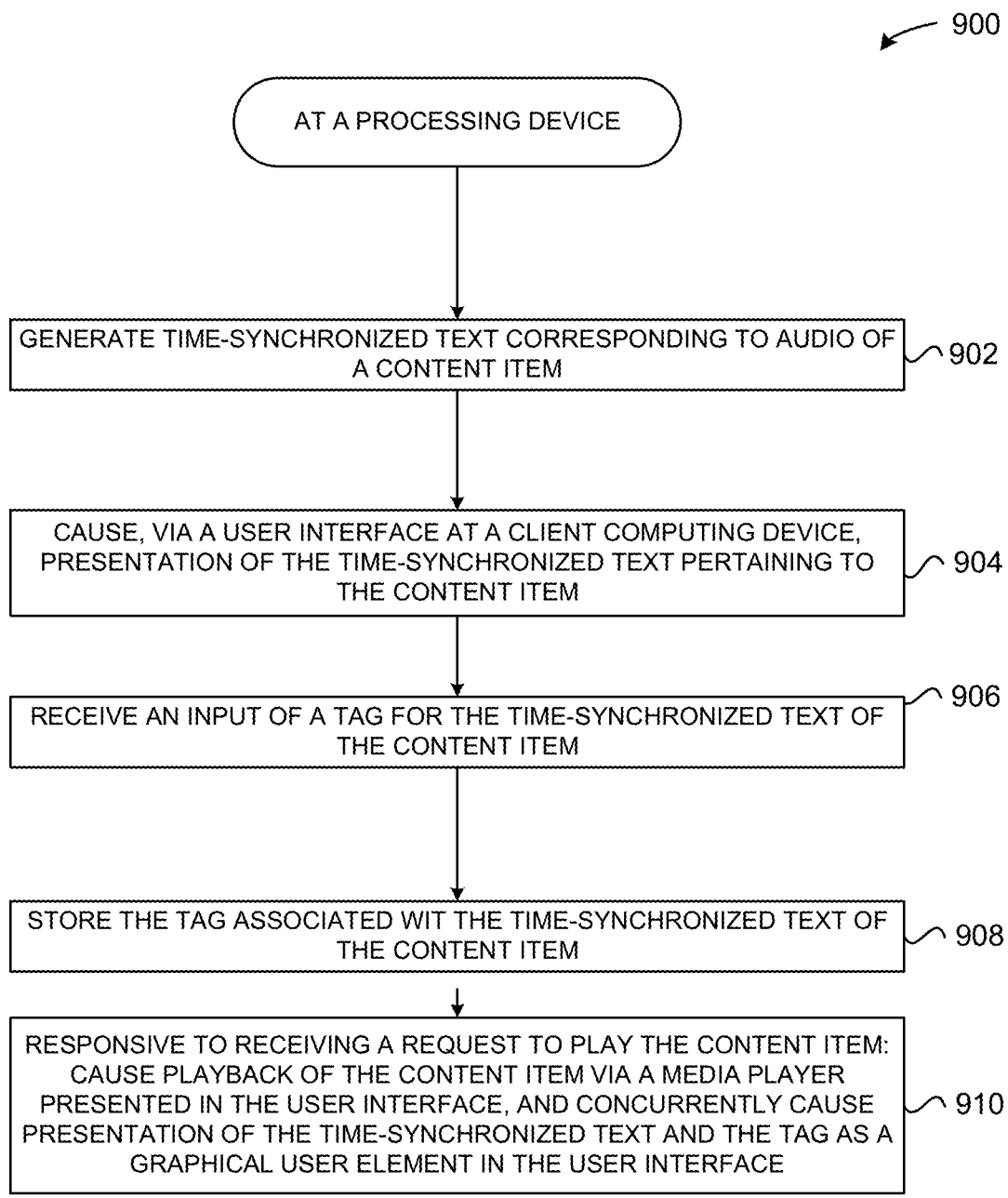
FIG. 9 illustrates an example of a method for enabling editing of tags for time-synchronized text according to certain embodiments of this disclosure.

FIG. 9 illustrates an example of a method 900 for enabling editing of tags for time-synchronized text according to certain embodiments of this disclosure. The method 900 may be performed by processing logic that may include hardware (circuitry, dedicated logic, etc.), software, or a combination of both. The method 900 and/or each of their individual functions, subroutines, or operations may be performed by one or more processors of a computing device (e.g., any component (server 128, training engine 152, machine learning models 154, etc.) of cloud-based computing system 116 and/or computing device 12 of FIG. 1) implementing the method 900. The method 900 may be implemented as computer instructions stored on a memory device and executable by the one or more processors. In certain implementations, the method 900 may be performed by a single processing thread. Alternatively, the method 900 may be performed by two or more processing threads, each thread implementing one or more individual functions, routines, subroutines, or operations of the methods.

At block 902, the processing device may generate time-synchronized text corresponding to audio of a content item. In some embodiments, the machine learning models 154 may be trained to process content items and generate time-synchronized text (e.g., lyrics) for corresponding audio of the content items. In some embodiments, the content item is a song and the time-synchronized text us a lyric.

At block 904, the processing device may cause, via the user interface 16 at the client computing device 12, presentation of the time-synchronized text pertaining to the content item.

At block 906, the processing device may receive an input of a tag for the time-synchronized text of the content item. In some embodiments, the tag may correspond to a stanza and may represent an intro, a verse, a pre-chorus, a chorus, a bridge, an outro, or some combination thereof.

At block 908, the processing device may store the tag associated with the time-synchronized text of the content item.

At block 910, responsive to receiving to request to play the content item, the processing device may cause playback of the content item via a media player presented in the user interface, and concurrently cause presentation of the time-synchronized text and the tag as a graphical user element in the user interface 160. In some embodiments, selection of any of the tags causes the media plyer to begin playback at a timestamp corresponding to the selected tag. Further, the set of tags may be presented in a portion of the user interface 160 separate from the time-synchronized text. In some embodiments, a seek bar may be presented in the user interface 160, and the user may use the seek bar to scroll through the content item. Simultaneous to the scrolling, the processing device may be updating the set of tags representing as the set of graphical user elements on the user interface 160.

Figure 10:
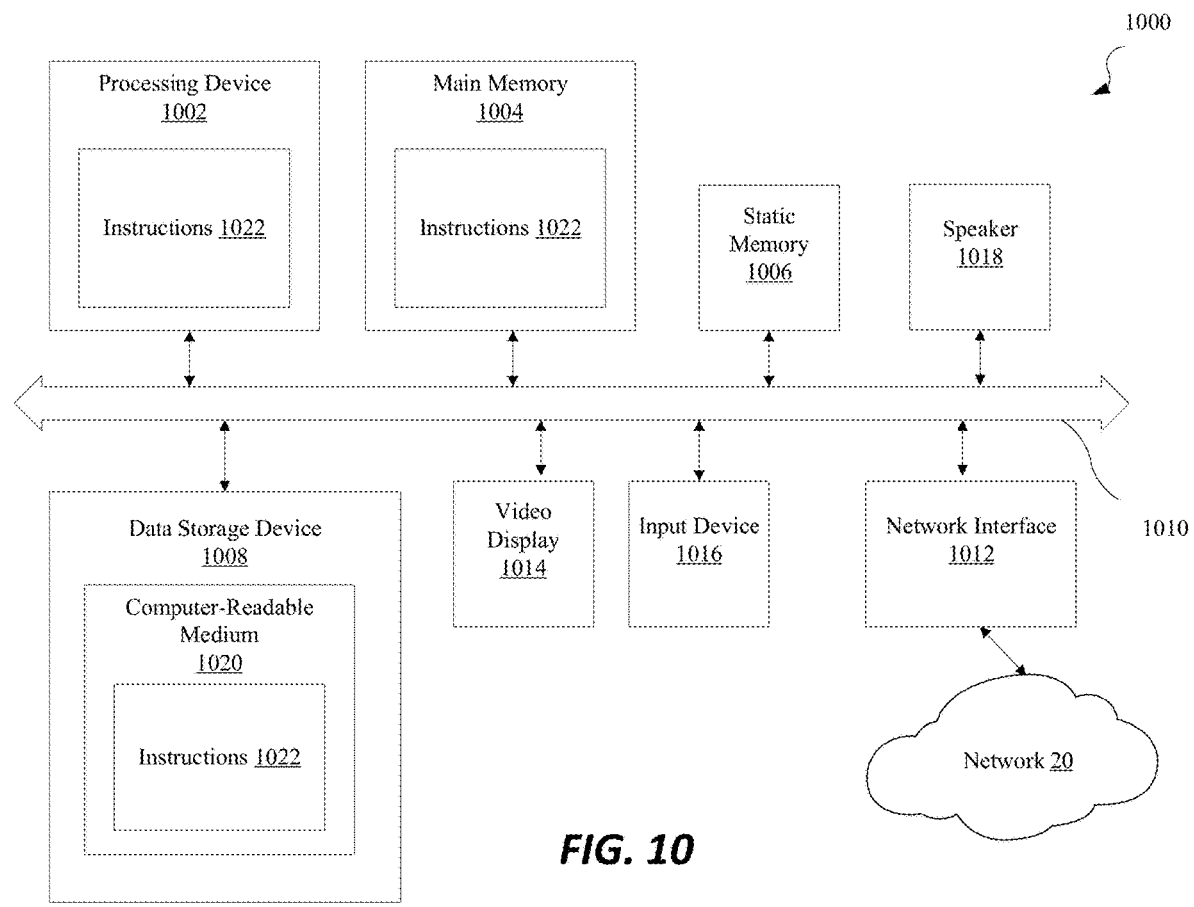
FIG. 10 illustrates an example computer system according to embodiments of this disclosure.

FIG. 10 illustrates an example computer system 1000, which can perform any one or more of the methods described herein. In one example, computer system 1000 may include one or more components that correspond to the computing device 12, one or more servers 128 of the cloud-based computing system 116, or one or more training engines 152 of the cloud-based computing system 116 of FIG. 1. The computer system 1000 may be connected (e.g., networked) to other computer systems in a LAN, an intranet, an extranet, or the Internet. The computer system 1000 may operate in the capacity of a server in a client-server network environment. The computer system 1000 may be a personal computer (PC), a tablet computer, a laptop, a wearable (e.g., wristband), a set-top box (STB), a personal Digital Assistant (PDA), a smartphone, a camera, a video camera, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The computer system 1000 includes a processing device 1002, a main memory 1004 (e.g., read-only memory (ROM), solid state drive (SSD), flash memory, dynamic random access memory (DRAM) such as synchronous DRAM (SDRAM)), a static memory 1006 (e.g., solid state drive (SSD), flash memory, static random access memory (SRAM)), and a data storage device 1008, which communicate with each other via a bus 1010.

Processing device 1002 represents one or more general-purpose processing devices such as a microprocessor, central processing unit, or the like. More particularly, the processing device 1002 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1002 may also be one or more special-purpose processing devices such as an application specific integrated circuit (ASIC), a field programmable gate array (FPGA), a digital signal processor (DSP), network processor, or the like. The processing device 1002 is configured to execute instructions for performing any of the operations and steps of any of the methods discussed herein.

The computer system 1000 may further include a network interface device 1012. The computer system 1000 also may include a video display 1014 (e.g., a liquid crystal display (LCD) or a cathode ray tube (CRT)), one or more input devices 1016 (e.g., a keyboard and/or a mouse), and one or more speakers 1018 (e.g., a speaker). In one illustrative example, the video display 1014 and the input device(s) 1016 may be combined into a single component or device (e.g., an LCD touch screen).

The data storage device 1016 may include a computer-readable medium 1020 on which the instructions 1022 embodying any one or more of the methodologies or functions described herein are stored. The instructions 1022 may also reside, completely or at least partially, within the main memory 1004 and/or within the processing device 1002 during execution thereof by the computer system 1000. As such, the main memory 1004 and the processing device 1002 also constitute computer-readable media. The instructions 1022 may further be transmitted or received over a network 20 via the network interface device 1012.

While the computer-readable storage medium 1020 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

The various aspects, embodiments, implementations or features of the described embodiments can be used separately or in any combination. The embodiments disclosed herein are modular in nature and can be used in conjunction with or coupled to other embodiments, including both statically-based and dynamically-based equipment. In addition, the embodiments disclosed herein can employ selected equipment such that they can identify individual users and auto-calibrate threshold multiple-of-body-weight targets, as well as other individualized parameters, for individual users.

The foregoing description, for purposes of explanation, used specific nomenclature to provide a thorough understanding of the described embodiments. However, it should be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It should be apparent to one of ordinary skill in the art that many modifications and variations are possible in view of the above teachings.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

Clauses:

Clause 1. A computer-implemented method for editing navigation of a content item, wherein the method comprises:
presenting, via a user interface at a client computing device, time-synchronized text pertaining to the content item;
receiving an input of a tag for the time-synchronized text of the content item;
storing the tag associated with the time-synchronized text of the content item; and
responsive to receiving a request to play the content item:
playing the content item via a media player presented in the user interface, and
concurrently presenting the time-synchronized text and the tag as a graphical user element in the user interface.

Clause 2. The computer-implemented method of any clause herein, further comprising:
responsive to receiving a selection of the graphical user element representing the tag, modifying playback of the content item to a timestamp associated with the tag.

Clause 3. The computer-implemented method of any clause herein, wherein the content item is a song and the time-synchronized text are lyrics.

Clause 4. The computer-implemented method of any clause herein, further comprising:
receiving a request to enter an edit mode;
responsive to receiving the request to enter the edit mode, pausing playback of the content item; and
simultaneously presenting the time-synchronized text in a first portion of the user interface; and
receiving the input of the tag in the first portion of the user interface.

Clause 5. The computer-implemented method of any clause herein, wherein the graphical user element representing the tag is generated in a second portion of the user interface.

Clause 6. The computer-implemented method of any clause herein, wherein the graphical user element is a text-structure shortcut.

Clause 7. The computer-implemented method of any clause herein, wherein:
the user interface comprises a plurality of tags representing text-structure shortcuts, and responsive to receiving a selection of a tag, the media player is configured to modify playback of the content item to a timestamp associated with the tag.

Clause 8. The computer-implemented method of any clause herein, further comprising:
receiving a voice command to play the tag of the content item; and
based on the voice command, using the media player to modify playback such that the content item is played at a timestamp associated with the tag of the content item.

Clause 9. A computer-implemented method for a client device presenting a media player, wherein the computer-implemented method comprises:
receiving a content item comprising a plurality of tags associated with a plurality of time-synchronized text items;
presenting, in a first portion of a user interface, the plurality of time-synchronized text items;
presenting, in a second portion of the user interface, the plurality of tags associated with the plurality of time-synchronized text items, wherein each of the plurality of tags presents a tag identity and a timestamp associated with a respective time-synchronized text item;
receiving, via the user interface, a selection of a first tag of the plurality of tags associated with the plurality of time-synchronized text items; and
causing a media player to begin playback of the content item at the timestamp for a time-synchronized text item corresponding to the selected first tag.

Clause 10. The computer-implemented method of any clause herein, further comprising identifying the time-synchronized text item by highlighting, modified font, color-coding, or some combination thereof.

Clause 11. The computer-implemented method of any clause herein, further comprising receiving a selection to edit the time-synchronized text item.

Clause 12. The computer-implemented method of any clause herein, further comprising receiving a modification to one of the plurality of tags and causing presentation of the modification to one of the plurality of tags on the user interface including the media player.

Clause 13. The computer-implemented method of any clause herein, wherein the content item is a song and the time-synchronized text item is a lyric of the song.

Clause 14. The computer-implemented method of any clause herein, further comprising:
receiving, via the user interface, a selection of a second tag of the plurality of tags associated with the plurality of time-synchronized text items; and
causing the media player to begin playback of the content item at a timestamp for a time-synchronized text item corresponding to the selected second tag.

Clause 15. A computer-implemented method for a server device to associate tags with time-synchronized text items of a content item, the computer-implemented method comprising:
generating time-synchronized text corresponding to audio of a content item;
causing, via a user interface at a client computing device, presentation of the time-synchronized text pertaining to the content item;
receiving an input of a tag for the time-synchronized text of the content item;
storing the tag associated with the time-synchronized text of the content item; and
responsive to receiving a request to play the content item:
causing playback of the content item via a media player presented in the user interface, and
concurrently causing presentation of the time-synchronized text and the tag as a graphical user element in the user interface.

Clause 16. The computer-implemented method of any clause herein, wherein the content item is a song and the time-synchronized text item is a lyric.

Clause 17. The computer-implemented method of any clause herein, wherein the tag identity comprises an intro, a verse, a chorus, an outro, or some combination thereof.

Clause 18. The computer-implemented method of any clause herein, wherein selection of any of the plurality of tags causes the media player to begin playback at a timestamp corresponding to any of the selected plurality of tags.

Clause 19. The computer-implemented method of any clause herein, further comprising causing presentation of the plurality of tags in the second portion of the user interface.

Clause 20. The computer-implemented method of any clause herein, further comprising enabling a seek bar to scroll through the content item and simultaneously updating the plurality of tags represented as a plurality of graphical user elements on the user interface.

The invention claimed is:
1. A computer-implemented method for a client device presenting a media player, wherein the computer-implemented method comprises:
receiving a content item comprising a song having a plurality of song structures and a plurality of tags associated with a plurality of time-synchronized text items and the plurality of song structures, wherein each of the plurality of tags is associated with a beginning timestamp of a respective song structure of a respective grouping of time-synchronized text items from the plurality of time-synchronized text items;
presenting, in a first portion of a user interface, the plurality of time-synchronized text items;
presenting, in a second portion of the user interface,
a seek bar configured to receive input causing the media player to scroll forward or backward within the content item,
the plurality of tags associated with the plurality of time-synchronized text items and the plurality of song structures, wherein (i) the plurality of tags are presented concurrently with one another along the seek bar in the user interface, (ii) the plurality of tags are presented concurrently with the plurality of time-synchronized text items, (iii) each of the plurality of tags presents a tag identity identifying the respective song structure and a beginning timestamp associated with the respective grouping of time-synchronized text items and the respective song structure, (iv) a first tag of the plurality of tags presenting both the tag identity and the beginning timestamp is actuated concurrently with a subset of the plurality of time-synchronized text items with which the first tag is associated during playback of the content item, (v) a second tag of the plurality of tags presenting both the tag identity and the beginning timestamp and a second subset of the plurality of time-synchronized text items remain unactuated during the playback of the content item, and (vi) scrolling forward or backward using the seek bar causes respective tags of the plurality of tags to be actuated in the user interface at respective times corresponding to a position of the seek bar;

receiving, via the user interface, a selection of a first tag of the plurality of tags associated with the plurality of time-synchronized text items; and causing a media player to begin playback of the content item at the timestamp for a grouping of time-synchronized text items corresponding to the selected first tag.

2. The computer-implemented method of claim 1, further comprising identifying the grouping of time-synchronized text items by highlighting, modified font, color-coding, or some combination thereof.

3. The computer-implemented method of claim 1, further comprising receiving a selection to edit the grouping of time-synchronized text items.

4. The computer-implemented method of claim 3, further comprising receiving a modification to one of the plurality of tags and causing presentation of the modification to one of the plurality of tags on the user interface including the media player.

5. The computer-implemented method of claim 1, wherein the content item is a song and the grouping of time-synchronized text items is a lyric of the song.

6. The computer-implemented method of claim 1, further comprising:

receiving, via the user interface, a selection of a second tag of the plurality of tags associated with the plurality of time-synchronized text items; and causing the media player to begin playback of the content item at a timestamp for a second grouping of time-synchronized text items corresponding to the selected second tag.

* * * * *